_United States Patent Office_

2,895,919
Patented July 21, 1959

2,895,919

CATALYST COMPOSITIONS

Howard L. Gerhart, Milwaukee, Wis., assignor to Pittsburgh Plate Glass Company, a corporation of Pennsylvania No Drawing. Application July 13, 1954
Serial No. 443,138

15 Claims. (Cl. 252—430)

This invention relates to novel catalyst compositions, and pertains more particularly to compositions comprising essentially dry, free flowing mixtures of liquid peroxides and siliceous materials.

Organic and inorganic peroxides are used extensively as catalysts in the polymerization of organic compounds such as vinyl, vinylidene and allyl monomers, diolefins, polymerizable polyesters and the like. Most of the peroxides are liquids under ordinary conditions of temperature, and are extremely reactive materials which decompose readily to yield active radial fragments which initiate chain growth of monomeric materials to form polymeric products. Most peroxides are so reactive, in fact, that they should be refrigerated in storage, and recommended precautions must be taken in handling to avoid rapid decomposition or even detonation. Some peroxides effective as catalysts in the lower temperature ranges, such as acetyl benzoyl peroxide, are too dangerous for shipment.

The fact that the peroxides are so reactive presents a serious handling problem, requiring highly skilled operating personnel. Even so, accidents have not infrequently occurred. The problem has become considerably more serious, particularly in the polyester resin field, with the advent of the highly popular resin "kits," containing a quantity of resin and catalyst, and sometimes a filler, useful in the construction and repair of boats, prototypes, for embedding specimens, and the like. In kits of this type the liquid peroxide has been supplied in glass containers. Therefore, breakage presents a serious problem. Also, since the peroxides are liquids, they are difficult to handle, and become quite dangerous in the hands of those individuals who are not skilled chemists. Obviously, most of the users of the resin kits have had little or no experience in handling peroxides. Accordingly, there has existed for some time a real need for peroxides in a form in which they can be easily and safely handled, even by individuals who are not skilled chemists.

It has now been discovered that when liquid peroxides are admixed with siliceous materials preferably having a defined particle size and surface area, essentially dry, free flowing compositions, or easily usable crumbly or grease-like compositions are obtained which can be added to a polymerizable material to initiate polymer chain growth just as effectively as when a liquid peroxide is added to the polymerizable material. Thus, according to the present invention, the peroxides are obtained in a convenient form, in which form they can readily be handled by unskilled individuals without significant danger of detonation. In this form the peroxides can also be packaged in simple materials such as paper bags, polyethylene containers or squeezable tubes which can be shipped with much more safety than the glass containers which have been used heretofore. Moreover, the presence of the siliceous material generally has no deleterious effect on either the polymerization process or on the final resinous product.

Any liquid peroxygen compound can be admixed with a siliceous material in accordance with the present invention to form an essentially dry, free flowing catalyst composition. Included among such liquid materials are isopropyl peroxydicarbonate, methyl ethyl ketone peroxide, cyclohexanone peroxide, cyclohexyl hydroperoxide, cumene hydroperoxide, t-butyl hydroperoxide, methyl amyl ketone peroxide, acetyl peroxide, methyl cyclohexyl hydroperoxide, t-butyl perbenzoate, t-butyl perphthalic acid, t-butyl peracetate, di-t-butyl peroxide, and the like. Especially useful catalyst compositions are obtained when cumene hydroperoxide, methyl ethyl ketone peroxide, t-butyl hydroperoxides or hydrogen peroxide are admixed with siliceous materials. Some of the liquid peroxides are ordinarily supplied as solutions in materials such as tricresyl phosphate, dimethyl phthalate, or the like. These solutions may also be used in preparing the catalyst compositions of this invention.

The siliceous material which is admixed with the liquid peroxide may vary widely in composition. Preferably, however, a material is utilized which in physical form is an extremely fine, porous, fluffy powder containing at least about 50 percent silicon dioxide ($SiO_2$), and having a surface area of about 10 to 800 square meters per gram, preferably 50 to 200 square meters per gram, and a particle size below 0.1 micron, usually from 0.01 to 0.05 micron. A relatively large number of materials possessing these characteristics are available commercially, and are ordinarily utilized as pigments in rubber or resin compositions and as paint flatting agents. Chemically, these materials are various forms of silica including hydrated silica, hydrated calcium silicate, colloidal silica, aluminum silicate, and similar materials.

The siliceous materials herein contemplated may be prepared by a large number of methods. A particularly effective method of preparing a hydrated silica involves reaction of a finely divided alkaline earth metal silicate, such as calcium silicate, having an average ultimate particle size below about 0.1 micron, with an acid having an anion which forms a water soluble salt with the alkaline earth metal. In the practice of this process, the acid is reacted with the alkaline earth metal silicate in an aqueous medium, and sufficient acid is added substantially to decompose the alkaline earth metal silicate, to extract the alkaline earth metal therefrom, and to prevent establishment of a concentration of alkaline earth metal in the silica above about 6 percent by weight of the silica pigment computed as the oxide of the alkaline earth metal. Consequently, sufficient acid normally is used to reduce the pH to below about 5, and usually in the range of about 3.0 to 5.0. During the acidification, the slurry of calcium silicate may be agitated in order to promote and facilitate reaction. In order to avoid use of excess acid, the acid is added in small portions until the desired pH has been reached, as indicated, for example, by suitable indicators such as methyl orange. In general, additions of large excesses of acids beyond a pH of 0.0, for example, are unnecessary. After the reaction of alkaline earth metal silicate with acid has been completed and the pH of the aqueous slurry has been reduced below about 4.0 to 5.3, precipitated silica is recovered, preferably by readjusting the pH of the slurry above 5.0, generally to about 5.0 to 9.0, and then filtering. The resulting pigment comprises finely divided, precipitated, hydrated porous silica flocs which contain in excess of 90 percent, preferably 94 percent or more, by weight of $SiO_2$, measured on the anhydrous basis (that is, on the basis excluding bound and free water), bound water in the proportion of about 3 to 9 moles (normally about 6 moles) of $SiO_2$ per mole of bound water, and from 2 to 10 percent of free water by weight of the pigment, and which has a surface area of about 60 to 200 square meters per gram, preferably in the range of 75 to 175 square meters per gram, and an average ultimate particle size below 0.1 micron, usually in the range of 0.015 to 0.05 micron. Preferably, this pigment will also contain no more than 1.75 percent, and generally less than 1 percent by weight of $Na_2O$, and may be free of $Na_2O$ entirely. The surface area of the pigment is determined by the Brunauer-Emmett-Peller method which is described in the Journal of the American Chemical Society, volume 60, page 309 (1938). This pigment may also contain a small amount of a metal of the group consisting of the alkaline earth metals such as calcium, magnesium, barium, or strontium, and zinc and aluminum. The metal is present ordinarily as the oxide, possibly in chemical association with the silica, and its percentage concentration normally ranges from 0.5 to 6 percent computed as the metal oxide based upon the weight of the pigment. It is believed quite surprising that the metals present in the pigment appear to have no effect whatsoever on the liquid peroxide, even over long periods of storage.

A second method of preparing a finely divided silica useful for admixing with liquid peroxides in accordance with the present invention involves the reaction of a mineral acid with an aqueous solution of an alkali metal silicate such as sodium silicate whereupon silica is precipitated in the form of finely divided discrete pigment particles.

A calcium silicate having a surface area ranging from about 50 to 150 square meters per gram, an average ultimate particle size below 0.1 micron, and usually in the range of about 0.01 to 0.05 micron, and useful for admixing with liquid peroxides to form the novel catalyst compositions of the present invention is readily prepared by a precipitation process in which an alkaline earth metal salt such as calcium chloride is reacted with sodium silicate in an aqueous medium and under conditions of severe agitation. As a consequence, the alkaline earth metal silicate precipitates in a finely divided state. The finely divided precipitate is then separated from the aqueous medium to give the siliceous material having the desired properties set forth above.

Still another useful method of producing a finely divided silica having a surface area and a particle size rendering it suitable for mixing with liquid peroxides to form essentially dry, free flowing compositions involves the reaction of an acid with an alkali metal silicate such as sodium silicate in an aqueous solution. When acids are added to such solutions, a jelly-like mass commonly called a "gel" is produced. The water present in the gel is then removed by an azeotropic distillation process, utilizing an alcohol such as butanol as the azeotropic entraining agent, the resulting dry product being a highly porous material having a surface area usually in the range of 275 to 800 square meters per gram.

In addition to the above methods of preparation, other forms of silica produced by oxidation and burning of a vaporized silicon compound, such as ethyl silicate or silicon tetrachloride, are also effective for the purposes of the present invention, although these processes are ordinarily too costly to warrant extensive use thereof.

It is to be understood that siliceous materials prepared by methods other than those disclosed hereinabove may be utilized to prepare the catalyst compositions of the present invention. Also, naturally occurring siliceous materials such as diatomaceous earth (kieselguhr), clays, and the like may also be employed. As disclosed hereinabove, such materials preferably should contain at least 50 percent $SiO_2$, have a surface area of from 10 to 800 square meters per gram, and a particle size of less than about 0.1 micron.

One important advantage of using a siliceous material possessing the properties described hereinabove lies in the fact that extremely high peroxide loadings can be obtained, that is, essentially dry, free flowing composition can be obtained even though large amounts of liquid peroxide are added to relatively small amounts of the siliceous material. Obviously, the ratio of liquid peroxide to siliceous material necessary to obtain an essentially dry, free flowing composition depends both upon the particular peroxide and the characteristics of the siliceous material. However, in general, it may be stated that any amount of a liquid peroxygen compound up to and including 80 percent by weight may be admixed with a siliceous material of the type disclosed hereinabove to obtain compositions which are essentially dry, free flowing materials, although when amounts as high as about 80 percent are utilized, the resulting compositions tend to be slightly damp and lumpy, or may even be in the form of a grease-like material. The slightly damp and lumpy materials, as well as the grease-like compositions, are much more easy to handle than the liquid peroxides and consequently are included within the scope of this invention. Preferably, the liquid peroxide is utilized in combination with the siliceous material in an amount from about 50 percent to about 75 percent or more by weight. Compositions containing substantially below about 50 percent by weight of peroxygen compound are not particularly desirable since relatively large amounts thereof must be employed to catalyze a polymerization reaction and since the presence of large quantities of the siliceous material provides a slight thixotropic effect upon the polymerizable material, which in some instances may be undesirable.

No special techniques are necessary to prepare the compositions of this invention. Preferably, however, the siliceous material is slowly stirred into the peroxygen compound in the desired quantity. Alternatively, the liquid peroxygen compound can be added to the siliceous material in an amount to produce a dry powder, or a lumpy or grease-like material.

Also, no special procedures are necessary in utilizing the compositions thus prepared as initiators of chain growth of polymerizable materials. All that is necessary is that the essentially dry, free flowing composition be added in an amount such that sufficient peroxygen compound will be present in the polymerizable mixture to initiate the polymerization to the desired degree. This is readily determined from the amount of peroxygen compound present in the catalyst composition. Because of the relative ease with which a dry catalyst composition of this type can be handled, the catalyst can be introduced into the polymerization mixture from a hopper or similar device in large commercial installations, or in smaller applications such as boat repairing, the catalyst can be added by means of a measuring spoon or similar device. The polymerization normally proceeds in the same manner as if the siliceous material were not present, although as pointed out hereinabove, in some instances when large quantities of the siliceous material are present a slight thixotropic effect upon the polymerizable material will be observed.

The following specific examples illustrate in detail the preparation of compositions comprising a mixture of a liquid peroxygen compound and a siliceous material of the type described hereinabove.

The examples are not intended to limit the invention, however, since there are, of course, numerous possible variations and modifications.

Example I

Four catalyst compositions were prepared utilizing 60 percent, 65 percent, 70 percent and 75 percent by weight respectively of t-butyl hydroperoxide, employing as the siliceous material a fine particle size hydrated silica having the following physical and chemical properties:

| | |
|---|---|
| Bulk density _____ pounds per cubic foot__ | 8 |
| Specific gravity _____ | 1.95 |
| Average particle size _____ microns__ | 0.030 |
| Color _____ | White |
| Refractive index _____ | 1.44 |
| Surface area _____ square meters per gram__ | 110 |
| pH in 5% water suspension _____ | 9.0 |
| Loss at 105° C. _____ percent__ | 5 |
| Loss on ignition _____ do____ | 10 |
| $SiO_2$ _____ do____ | 85 |
| CaO _____ do____ | 3.0 |
| $Fe_2O_3$ _____ do____ | 0.3 |
| $Al_2O_3$ _____ do____ | 0.3 |
| NaCl _____ do____ | 1.5 |

In each instance the catalyst composition was prepared by adding the siliceous material to the liquid peroxide with constant stirring. In each example a useful, free flowing composition was obtained, with those containing 60, 65, and 70 percent liquid peroxide being essentially dry, and that containing 75 percent of the peroxide being only slightly damp.

Example II

Example I is repeated utilizing in one set of samples methyl ethyl ketone peroxide (60 percent solution in dimethyl phthalate), and in a second set of samples tertiary butyl hydroperoxide. In each instance a free flowing composition was obtained with the samples containing 75 percent by weight of the liquid peroxide being slightly damp and lumpy, but nevertheless being useful products.

Example III

Examples I and II were repeated except that the siliceous material utilized was first purified by mixing in the presence of water with an ion exchange resin in the pulverulent form but having a particle size substantially larger than that of the silica subjected to treatment and selectively separating the resin from the resulting silica slurry and recovering the treated silica essentially free from resin. This treatment removes the $Na_2O$ combined with the silica (the $Na_2O$ being present in an amount up to about 3 percent by weight), and/or up to about 7 or 8 percent by weight of polyvalent cations such as calcium, magnesium, aluminum or the like, as well as appreciable amounts (0.5 to 5.0 percent by weight) of anions due to the presence of alkali metal salts such as sodium carbonate, sodium bicarbonate, sodium chloride and the like.

In each instance the resulting compositions were free flowing and essentially dry, with the samples containing 75 percent of the liquid peroxide tending to be slightly damp with small lumps therein.

Example IV

Two catalyst compositions, containing 60 and 65 parts respectively of t-butyl hydroperoxide and 40 and 35 parts respectively of the siliceous material described in Example I, were prepared and added to a polymerizable composition comprising propylene maleate phthalate, styrene, and small quantities of gelation inhibitors. The compositions containing 60 parts of t-butyl hydroperoxide and 40 parts of the siliceous material gelled in 146 minutes at 77° F., and the material containing the catalyst composition comprising 65 parts of t-butyl hydroperoxide and 35 parts of the sliceous material gelled in 134 minutes at 77° F.

A similar polyester resin containing a free flowing catalyst composition consisting of 65 parts of methyl ethyl ketone peroxide (60 percent solution in dimethyl phthalate) and 35 parts of the siliceous material described in Example I gelled in 91 minutes at 77° F.

Example V

Sixty-five parts of methyl ethyl ketone peroxide (60 percent solution in dimethyl phthalate) was admixed with 35 parts of a siliceous material known commercially as Silene EF. The resulting composition was in the form of a free flowing, essentially dry powder. This material was then added to the polyester-styrene composition described in the preceding example. The polymerizable composition gelled in 110 minutes at 77° F.

A free flowing, essentially dry, powdered catalyst composition was also obtained when 55 parts of t-butyl hydroperoxide and 45 parts of Silene EF were admixed.

Example VI

Seventy-five parts of cumene hydroperoxide was admixed with 25 parts of a siliceous material known commercially as Santocel-C. The resulting composition was essentially dry and free flowing. A similar composition was obtained when Santocel-ARD was substituted for Santocel-C.

Example VII

Fifty parts of diatomaceous earth and 50 parts of cumene hydroperoxide were admixed with stirring, the resulting composition being in the form of a paste. In this form the material could be packaged in a squeezable tube from which the catalyst composition could readily and safely be added to a polymerizable composition. If a free flowing crumbly mass or powder is desired the percentage of diatomaceous earth in the catalyst composition should be increased.

Example VIII

Fifty parts of a non-fibrous calcium silicate known commercially as Wolastonite, and 50 parts of methyl ethyl ketone peroxide (60 percent solution in dimethyl phthalate) were admixed with stirring to form a paste which could be easily and safely added to a polymerizable material to initiate polymer chain growth.

Example IX

Sixty-five parts of a 30 percent aqueous solution of hydrogen peroxide were admixed with 35 parts of a siliceous material known commercially as Hi-Sil. The resulting composition was a free flowing powder. Three and three-tenths grams of the powder was added to 100 grams of a polyester-styrene composition such as that described in Example IV. A hard resin was obtained in two hours at 80° F.

When the above examples are repeated substituting other liquid peroxides for those shown in the examples, or utilizing other siliceous materials of the type described hereinabove, useful catalyst compositions are obtained which can be handled easily and with safety, and which can be utilized to initiate the polymerization of materials such as polyesters, vinyl monomers, and the like, to form resinous polymers which are in all respects equivalent to polymers prepared utilizing liquid peroxygen compounds. As will be apparent from the examples, free flowing, essentially dry compositions are ordinarily obtained and such materials are preferred. However, catalyst compositions having a crumbly consistency or even grease-like materials are obviously much easier to use than liquid peroxides.

From the foregoing description of the invention, it will be seen that the compositions comprising a mixture of a liquid peroxygen compound and a siliceous material constitute a novel and useful class of compositions.

It is apparent, therefore, that various embodiments of the invention, in addition to those specifically disclosed, may be provided without departing from the spirit and scope of the invention as defined in the appended claims.

I claim:

1. A polymerization catalyst consisting essentially of a liquid peroxygen compound and a siliceous material containing at least about 50 percent by weight of $SiO_2$, and possessing a surface area of from about 10 to 800 square meters per gram, said polymerization catalyst containing from about 50 percent to about 80 percent by weight of said liquid peroxygen compound.

2. The polymerization catalyst of claim 1 wherein the siliceous material has a particle size of less than about 0.1 micron.

3. A polymerization catalyst consisting essentially of a mixture of a liquid peroxygen compound and a siliceous material containing at least about 50 percent by weight of $SiO_2$, and possessing a surface area of about 10 to about 800 square meters per gram and a particle size of less than about 0.1 micron, said polymerization catalyst containing from about 50 percent to about 75 percent by weight of said liquid peroxygen compound.

4. The polymerization catalyst of claim 3 wherein the surface area of the siliceous material is from about 50 to 200 square meters per gram and the particle size thereof is from about 0.01 to 0.05 micron.

5. An essentially dry, free flowing polymerization catalyst consisting essentially of a mixture of a liquid peroxygen compound and a siliceous material containing at least about 50 percent by weight of $SiO_2$, and possessing a surface area of about 10 to about 800 square meters per gram and a particle size of less than about 0.1 micron, said polymerization catalyst containing from about 50 percent to about 75 percent by weight of said liquid peroxygen compound.

6. An essentially dry, free flowing polymerization catalyst consisting essentially of a mixture of a liquid peroxygen compound and a hydrated silica containing at least about 90 percent by weight of $SiO_2$, and possessing a surface area of about 50 to 200 square meters per gram and a particle size of from about 0.01 to 0.05 micron, said polymerization catalyst containing from about 50 percent to about 75 percent by weight of said peroxygen compound.

7. The method of claim 6 wherein the liquid peroxygen compound is cumene hydroperoxide.

8. The polymerization catalyst of claim 6 wherein the liquid peroxygen compound is methyl ethyl ketone peroxide.

9. The polymerization catalyst of claim 6 wherein the liquid peroxygen compound is t-butyl hydroperoxide.

10. The polymerization catalyst of claim 6 wherein the liquid peroxygen compound is hydrogen peroxide.

11. An essentially dry, free flowing polymerization catalyst consisting essentially of a mixture of a liquid peroxygen compound and a percipitated hydrated calcium silicate containing at least about 50 percent by weight of $SiO_2$, and possessing a surface area of from about 50 to about 150 square meters per gram and a particle size of from about 0.01 to 0.05 micron, said polymerization catalyst containing from about 50 percent to about 75 percent by weight of said liquid peroxygen compound.

12. The polymerization catalyst of claim 11 wherein the liquid peroxygen compound is cumene hydroperoxide.

13. The polymerization catalyst of claim 11 wherein the liquid peroxygen compound is methyl ethyl ketone peroxide.

14. The polymerization catalyst of claim 11 wherein the liquid peroxygen compound is t-butyl hydroperoxide.

15. The polymerization catalyst of claim 11 wherein the liquid peroxygen compound is hydrogen peroxide.

References Cited in the file of this patent

UNITED STATES PATENTS

| | | |
|---|---|---|
| 2,559,934 | Huijser | Oct. 21, 1941 |
| 2,525,144 | Mavity | Oct. 10, 1950 |
| 2,557,256 | Brubaker | June 19, 1951 |
| 2,593,098 | Burt | Apr. 15, 1952 |